(No Model.)
R. T. TORKELSON.
BICYCLE.
No. 496,803. Patented May 2, 1893.
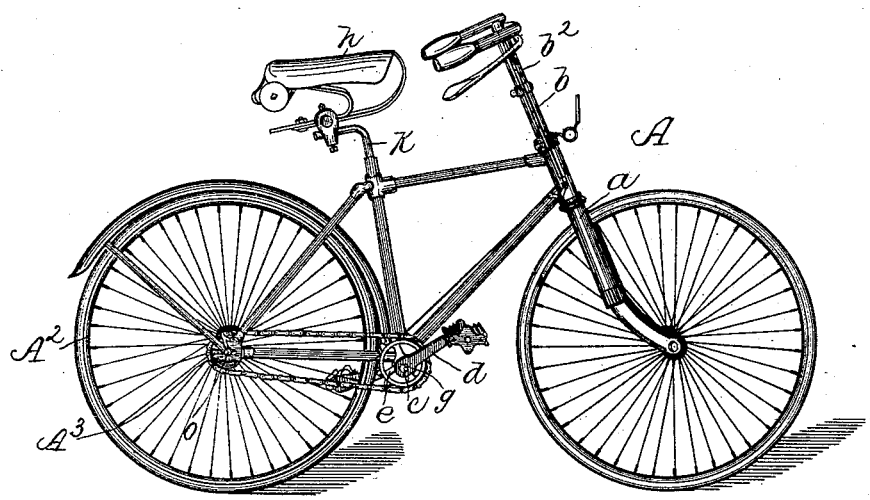
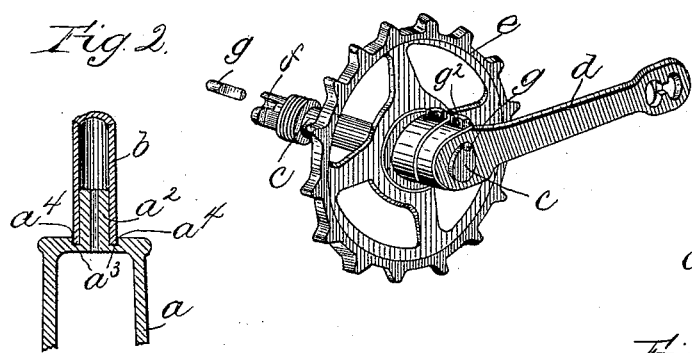
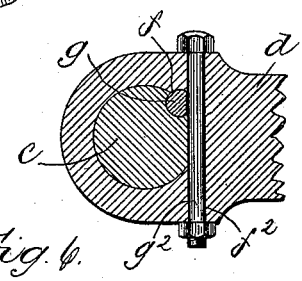
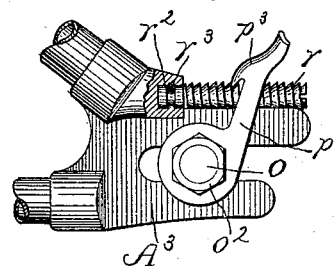
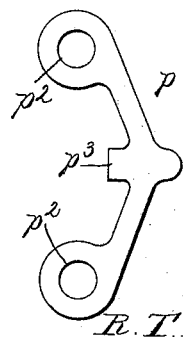
Witnesses
Jas. J. Maloney
M. E. Hill
Inventor
R. T. Torkelson
by Jno. P. Livermore
Att'y

UNITED STATES PATENT OFFICE.

REINHARD T. TORKELSON, OF WORCESTER, MASSACHUSETTS, ASSIGNOR OF ONE-HALF TO JOHN C. SPEIRS, OF SAME PLACE.

BICYCLE.

SPECIFICATION forming part of Letters Patent No. 496,803, dated May 2, 1893.

Application filed February 23, 1892. Serial No. 422,443. (No model.)

*To all whom it may concern:*

Be it known that I, REINHARD T. TORKELSON, of Worcester, county of Worcester, and State of Massachusetts, have invented an Improvement in Bicycles, of which the following description, in connection with the accompanying drawings, is a specification, like letters on the drawings representing like parts.

My invention is embodied in a bicycle and consists in details of construction of various parts including the construction of the joint between the front fork and steering head; of the key connections of the crank with the driving shaft; and of the devices for effecting the chain adjustment in a bicycle of the type in which the crank axle is connected with the driving wheel through a sprocket and chain gearing.

Figure 1 is a side elevation of a bicycle embodying this invention; Fig. 2 a sectional detail showing the improved construction in the rigid joints of the framing; Fig. 3 a perspective view showing the crank axle and appliances for keying the crank and sprocket wheel thereon; Fig. 4 a sectional detail of the key connection of the crank axle; Fig. 5 an enlarged detail of the chain adjusting mechanism, and Fig. 6 a plan of the blank from which a portion of the chain adjusting mechanism is composed.

The invention is shown as embodied in a safety bicyle, A Fig. 1, which may be of any usual construction and design, except in the details hereinafter referred to. In the construction of the framing at the junction of the front steering fork $a$ see Fig. 2, with the tubular neck $b$, that receives the handle bar piece $b^2$, it has been customary to provide the forging with a tenon $a^2$ see Fig. 2, to enter the tube $b$ and to be secured therein by a transverse pin and by brazing. In the ordinary construction the brazing does not afford a secure hold as it enters mainly between the under surface of the tube and the shoulder at the base of the tenon, so that any strain tending to separate the parts is applied mainly at right angles to the brazed surface and tends to pull the brazing assunder. In order to increase the strength of such joint, the forging $a$ is in accordance with the present invention provided with a groove or recess $a^3$ see Fig. 2, around the base of the tenon of proper size to receive the tube $b$, within the said recess so as to inclose the outer surface of the tube for a short distance from its end. The brazing thus enters between the outer surface of the tube and the inner surface of the groove in the forging as shown at $a^4$, and affords a very secure hold as the strain tending to separate the parts is applied in a direction parallel with the surfaces united by brazing and not at right angles thereto and thus requires the shearing of the entire brazed joint before separation of the parts can take place.

The construction of the key by which the crank and sprocket wheel or other devices to be detachably secured to the driving shaft $c$ are so fastened is best shown in Figs. 3 and 4. The said shaft having the crank and sprocket wheel or other parts to be keyed thereto applied upon the shaft is provided with a longitudinal bore $f$ which is formed part in the periphery of the shaft $c$ and part in the corresponding bore in the piece to be secured to said shaft as clearly shown in Fig. 4. The said bore then receives a key pin $g$ which may extend both through the bore in the crank $d$ and that in the sprocket $e$ when both are to be applied side by side on the axle $c$ as shown in Fig. 3, the said key pin $g$ thus securely locking the crank, sprocket, or other part against rotation independent of the axle $c$.

In order to prevent the crank or key pin $g$ from pulling off endwise from the axle, a transverse bore is made at $f^2$ through the hub portion of the crank or part to be attached so as to cut in slightly to one side of the key pin $g$ and of the axle $c$ as shown in Fig. 4, and a locking pin $g^2$ is secured in said transverse bore in any usual manner as by providing said locking pin with a bolt head at one end and with a nut at the other end. By this construction the key pin $g$ withstands the torsional strain, and the locking pin $g^2$ merely has to engage with the said key pin and shaft $c$, to a sufficient depth to prevent withdrawal of the key pin, or crank endwise from the shaft, which does not need to be cut away to a great depth and thus materially weakened as is the case when a transverse pin is employed to both lock the crank on the shaft and also to prevent torsional movement of the crank relative to the shaft. The crank may be detached merely by removing the locking pin $g^2$ and without necessarily withdrawing the key pin $g$.

The bicycle may be provided with a saddle $h$, supported on the usual saddle support $k$.

In order to take up the slack in the driving chain $n$ which connects the sprocket $e$ on the driving shaft with a sprocket on the hub of the rear wheel $A^2$ the hub or spindle $o$ on which the rear wheel turns, is fixed in a longitudinal slot or fork in the portion $A^3$ of the frame as best shown in Fig. 5, being locked at the desired position in said slot by a check nut $o^2$. In order to facilitate the adjustment of the spindle $o$ in the said slot preparatory to locking the same a pawl shaped washer $p$ is employed, preferably made from a blank of the form shown in Fig. 6, having two arms provided in their ends with eyes $p^2$, which when the said arms are folded toward one another embrace the fork $A^3$ between them, one of said eyes $p^2$ passing over the spindle $o$ at the inside of the fork, and the other at the outside thereof, beneath the nut $o^2$ so that the said eyes practically constitute washers at the inside and outside of the fork $A^3$. The fold at the junction of the arms is shaped to form a tooth or pawl $p^3$ which engages with the threads of a ratchet threaded screw $r$ that lies along the upper branch of the fork $A^3$ and has its unthreaded end extended into a recess in the said fork piece and provided with a circumferential groove $r^2$ engaged by a transverse pin $r^3$ thus enabling the screw $r$ to be rotated without producing longitudinal movement of the screw with relation to the frame piece $A^3$.

When it is necessary to adjust the position of the wheel spindle $o$ in the frame piece $A^3$ to bring the driving chain to the proper condition the nut $o^2$ is loosened, when by properly manipulating the washer pawl $p, p^3$, it may be ratcheted along the threads of the screw $r$ to approximately the required position by a quick adjustment and then when pressed into engagement with the thread of the screw $r$ a very fine adjustment may be made by turning the said screw $r$. The pawl projection $p^3$ is at the rear of the axle $o$ so that the strain on the pawl in the operation of adjustment tends to draw its end into engagement with the thread of the adjusting screw. When brought to the proper position the nut $o^2$ is tightened thus locking the wheel spindle firmly while the engagement of the pawl with the screw will prevent the wheel spindle from working forward under the strain of the driving chain if the nut $o^2$ should fail to hold securely.

I claim—

1. In a bicycle the combination of the front steering fork $a$, provided with a tenon $a^2$, and a groove or recess $a^3$, around the base thereof, with the tubular neck $b$, fitting over the tenon and having a portion of its end extended into said groove $a^3$, and brazed therein, substantially as and for the purpose described.

2. The combination of the driving axle and part to be keyed thereon, with a key piece entering a longitudinal recess in the periphery of the axle and piece to be keyed thereon, and a locking pin secured in said piece to be keyed and engaging transverse recesses one in the periphery of said key and the other in the axle, whereby the said key prevents relative rotation of the parts, and said locking pin positively secures both the key and the part to be keyed from withdrawing endwise from the axle, substantially as and for the purpose described.

3. The combination of the sprocketed wheel of a bicycle and its bearing spindle, with the frame piece provided with a slot to receive the spindle, a pawl connected with said wheel spindle and a ratchet threaded adjusting screw cooperating with said pawl, substantially as and for the purpose described.

In testimony whereof I have signed my name to this specification in the presence of two subscribing witnesses.

REINHARD T. TORKELSON.

Witnesses:
JOS. P. LIVERMORE,
M. E. HILL.